(12) United States Patent
Min et al.

(10) Patent No.: US 11,856,714 B2
(45) Date of Patent: Dec. 26, 2023

(54) DISPLAY DEVICE AND METHOD OF MANUFACTURING THE SAME

(71) Applicant: Samsung Display Co., Ltd., Yongin-Si (KR)

(72) Inventors: Myungan Min, Cheonan-si (KR); Yonggi Ko, Asan-si (KR); Hyoung-Jin Lee, Cheonan-si (KR); Hyeji Jang, Asan-si (KR)

(73) Assignee: SAMSUNG DISPLAY CO., LTD., Gyeonggi-do (KR)

( * ) Notice: Subject to any disclaimer, the term of this patent is extended or adjusted under 35 U.S.C. 154(b) by 439 days.

(21) Appl. No.: 17/095,022

(22) Filed: Nov. 11, 2020

(65) Prior Publication Data

US 2021/0282279 A1    Sep. 9, 2021

(30) Foreign Application Priority Data

Mar. 4, 2020  (KR) .......................... 10-2020-0026893

(51) Int. Cl.
*G09F 9/30* (2006.01)
*H05K 5/00* (2006.01)
(Continued)

(52) U.S. Cl.
CPC ......... *H05K 5/0017* (2013.01); *B29C 43/021* (2013.01); *B29C 43/203* (2013.01); *B32B 3/30* (2013.01); *B32B 5/18* (2013.01); *B32B 15/046* (2013.01); *B32B 15/08* (2013.01); *B32B 27/065* (2013.01); *B32B 27/08* (2013.01); *B32B 27/281* (2013.01); *B32B 27/36* (2013.01);
(Continued)

(58) Field of Classification Search
CPC .............. H05K 5/0017; H04M 1/0268; H04M 1/0214; B29C 43/021; B29C 43/203; B29C 2043/023; B32B 3/30; B32B 5/18; G06F 1/1652; G06F 9/301
USPC ..................................................... 361/679.01
See application file for complete search history.

(56) References Cited

U.S. PATENT DOCUMENTS 10,429,895 B2   10/2019 Lee
2014/0226275 A1  8/2014 Ko et al.
(Continued)

FOREIGN PATENT DOCUMENTS

CN   108847137 A  * 11/2018  ............. G09F 9/301
KR   101215127 B1   12/2012
(Continued)

OTHER PUBLICATIONS

Extended European Search Report for Application No. 21160600.9 dated Jul. 13, 2021 enumerating the above listed references.

*Primary Examiner* — Ruiyun Zhang
(74) *Attorney, Agent, or Firm* — CANTOR COLBURN LLP

(57) ABSTRACT

A display device includes a first non-foldable area, a second non-foldable area, and a foldable area. The display device includes a display module including a display panel, a support substrate supporting the display module, including an upper surface facing the display module and a lower surface opposite to the upper surface, and provided with a groove defined in the lower surface to overlap the foldable area, a first support plate disposed under the support substrate, and a second support plate disposed under the support substrate and spaced apart from the first support plate in the foldable area.

15 Claims, 14 Drawing Sheets

(51) Int. Cl.

| | | |
|---|---|---|
| *B29C 43/02* | (2006.01) | |
| *B29C 43/20* | (2006.01) | |
| *B32B 5/18* | (2006.01) | |
| *B32B 27/06* | (2006.01) | |
| *B32B 27/08* | (2006.01) | |
| *B32B 27/28* | (2006.01) | |
| *B32B 27/36* | (2006.01) | |
| *B32B 27/40* | (2006.01) | |
| *G06F 1/16* | (2006.01) | |
| *H04M 1/02* | (2006.01) | |
| *B32B 3/30* | (2006.01) | |
| *B32B 15/08* | (2006.01) | |
| *B32B 15/04* | (2006.01) | |
| *B29K 75/00* | (2006.01) | |
| *B29K 105/04* | (2006.01) | |
| *B29L 31/34* | (2006.01) | |

(52) U.S. Cl.
CPC ............ *B32B 27/40* (2013.01); *G06F 1/1652* (2013.01); *G09F 9/301* (2013.01); *H04M 1/0268* (2013.01); *B29C 2043/023* (2013.01); *B29K 2075/00* (2013.01); *B29K 2105/04* (2013.01); *B29L 2031/3475* (2013.01); *B32B 2255/26* (2013.01); *B32B 2266/0278* (2013.01); *B32B 2307/732* (2013.01); *B32B 2457/20* (2013.01); *G06F 2203/04102* (2013.01); *H04M 1/0214* (2013.01)

(56) References Cited

U.S. PATENT DOCUMENTS

| | | | |
|---|---|---|---|
| 2017/0061836 | A1 | 3/2017 | Kim et al. |
| 2018/0145278 | A1* | 5/2018 | Zhai ................ H10K 59/12 |
| 2019/0251876 | A1 | 8/2019 | Kim |
| 2019/0265758 | A1* | 8/2019 | Han ................. G06F 1/1681 |
| 2020/0317968 | A1 | 10/2020 | Park et al. |

FOREIGN PATENT DOCUMENTS

| | | |
|---|---|---|
| KR | 1020170127787 A | 11/2017 |
| KR | 1020190082339 A | 7/2019 |
| WO | 2019117595 A1 | 6/2019 |

* cited by examiner

DISPLAY DEVICE AND METHOD OF MANUFACTURING THE SAME

This application claims priority to Korean Patent Application No. 10-2020-0026893, filed on Mar. 4, 2020, and all the benefits accruing therefrom under 35 U.S.C. § 119, the content of which in its entirety is herein incorporated by reference.

BACKGROUND

1. Field of Disclosure

The present disclosure relates to a display device and a method of manufacturing the same. More particularly, the present disclosure relates to a display device having improved reliability and a method of manufacturing the display device.

2. Description of the Related Art

A display device displays various images through a display screen to provide a user with information. In general, the display device displays the information in an allocated screen area. A flexible display device including a flexible display panel that is able to be folded is being developed. Different from a rigid display device, the flexible display device is foldable, rollable, or bendable. The flexible display device, which is capable of being transformed into various shapes, is easy to carry and improves a user's convenience regardless of the original size of the display screen.

SUMMARY

The present disclosure provides a display device having improved reliability.

The present disclosure provides a method of manufacturing the display device to prevent appearance defects in a foldable area of the display device.

Embodiments of the inventive concept provide a display device including a first non-foldable area, a second non-foldable area, and a foldable area. The display device includes a display module including a display panel, a support substrate supporting the display module, including an upper surface facing the display module and a lower surface opposite to the upper surface, and provided with a groove defined in the lower surface to overlap the foldable area in a thickness direction of the support substrate, a first support plate disposed under the support substrate, and a second support plate disposed under the support substrate and spaced apart from the first support plate in the foldable area.

The groove may overlap an entirety of the foldable area.

The support substrate may further include a protective layer disposed along a surface of the groove.

The protective layer may include an ultraviolet coating member.

The protective layer may include an anti-static material.

The support substrate may have a thickness in the thickness direction greater than a thickness of the first support plate and greater than a thickness of the second support plate.

A thickness of the support substrate may be in a range from about 0.2 millimeters (mm) to about 0.25 mm.

A depth of the groove in the thickness direction of the support substrate may be equal to or smaller than a half of a thickness of the support substrate.

The groove may be provided in plural, and the grooves may be arranged continuously or discontinuously in the foldable area.

The first support plate and the second support plate may include a metal material.

The display device may further include a first cushion member disposed under the first support plate and overlapping a portion of the foldable area and a portion of the first non-foldable area in the thickness direction and a second cushion member disposed under the second support plate and overlapping another portion of the foldable area and a portion of the second non-foldable area in the thickness direction.

Each of the first cushion member and the second cushion member may have a thickness from about 6 micrometers to about 10 micrometers.

The display device may further include a first auxiliary plate disposed under the first cushion member in the thickness direction and overlapping the first cushion member and a second auxiliary plate disposed under the second cushion member and overlapping the second cushion member in the thickness direction.

The display module may have a first state in which the display module is flat and a second state in which the display module in the foldable area is bent such that the first non-foldable area faces the second non-foldable area.

Embodiments of the inventive concept provide a method of manufacturing a display device including providing a display module including a first non-foldable area, a second non-foldable area, and a foldable area, providing a support substrate under the display module, and providing a first support plate and a second support plate to be spaced apart from each other in the foldable area under the support substrate. The support substrate includes an upper surface facing the display module and a lower surface opposite to the upper surface, and the support substrate is provided with a groove defined in the lower surface to overlap the foldable area in a thickness direction of the support substrate.

The providing of the support substrate may include providing a preliminary support substrate and defining the groove in the preliminary support substrate using a jig.

The providing of the preliminary support substrate may include coating a foam resin on a release film, and the defining of the groove may include drying the coated foam resin while pressing the preliminary support substrate with the jig.

The jig may include a coating layer formed on a surface of the jig and which makes contact with the preliminary support substrate.

The providing of the support substrate may further include coating a protective layer along a surface of the formed groove.

The jig may include protrusion formed on a surface of the jig and which makes contact with the preliminary support substrate to overlap the foldable area and to correspond to the groove in the thickness direction.

The providing of the support substrate may include disposing a first adhesive member on the upper surface of the support substrate and disposing the display module on the first adhesive member.

The providing of the first and second support plates may include disposing a second adhesive member on the lower surface of the support substrate to overlap the first non-foldable area and the second non-foldable area in the thickness direction and disposing the first and second support plates on the second adhesive member.

According to the above, the support substrate disposed under the display panel as a cushion layer may have a thick thickness to support the display panel. In addition, since the groove is formed in the lower surface of the support substrate to overlap the foldable area, the display panel may be easily folded despite the thick thickness of the support substrate and the foreign substances may be collected and discharged when the foreign substances are introduced. Thus, defects due to denting or pressing may be prevented.

BRIEF DESCRIPTION OF THE DRAWINGS

The above and other advantages of the present disclosure will become readily apparent by reference to the following detailed description when considered in conjunction with the accompanying drawings wherein.

DETAILED DESCRIPTION

Figure 1A:
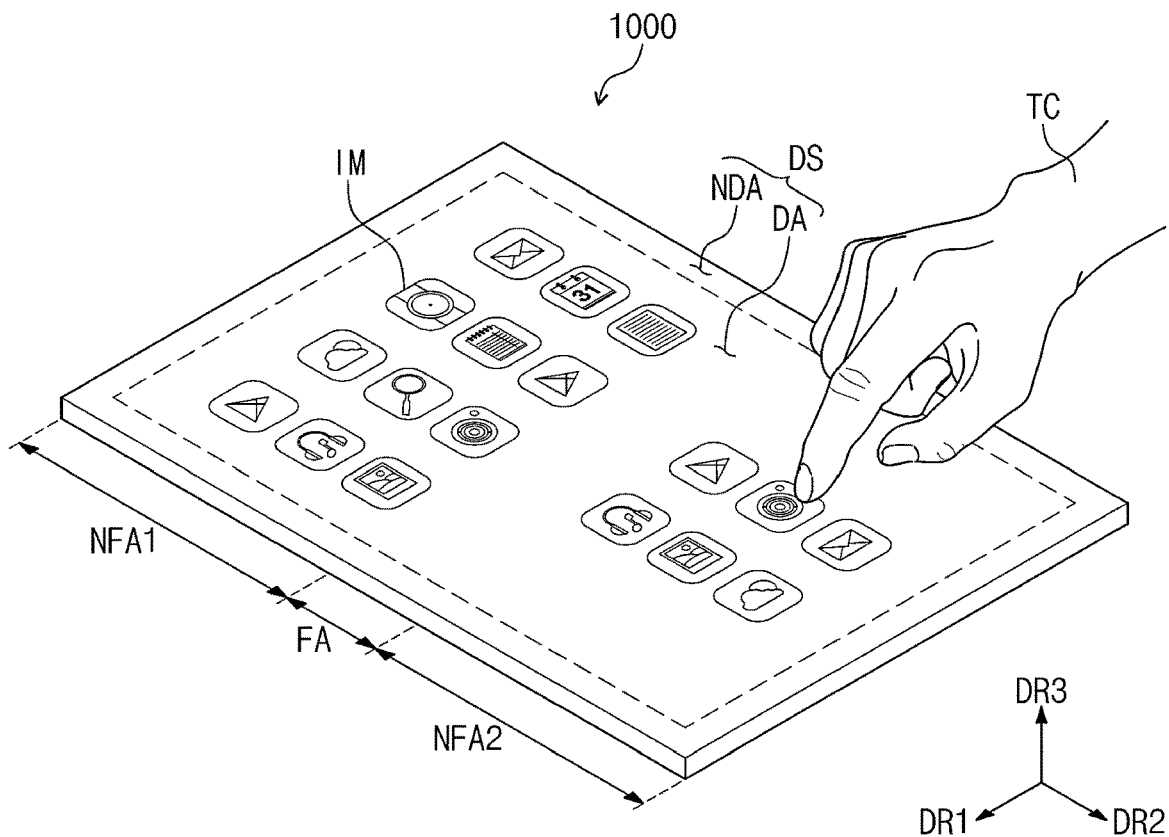
FIGS. 1A and 1B are perspective views showing a display device according to an exemplary embodiment of the present disclosure.

In the present disclosure, it will be understood that when an element or layer is referred to as being "on", "connected to" or "coupled to" another element or layer, it can be directly on, connected or coupled to the other element or layer or intervening elements or layers may be present.

Like numerals refer to like elements throughout. In the drawings, the thickness, ratio, and dimension of components are exaggerated for effective description of the technical content. As used herein, the term "and/or" includes any and all combinations of one or more of the associated listed items. "Or" means "and/or."

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present disclosure. As used herein, the singular forms, "a", "an" and "the" are intended to include the plural forms as well, including "at least one," unless the context clearly indicates otherwise. "At least one" is not to be construed as limiting "a" or "an."

Spatially relative terms, such as "beneath", "below", "lower", "above", "upper" and the like, may be used herein for ease of description to describe one element or feature's relationship to another element(s) or feature(s) as shown in the figures.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present disclosure will be described with reference to accompanying drawings.

Figure 1B:
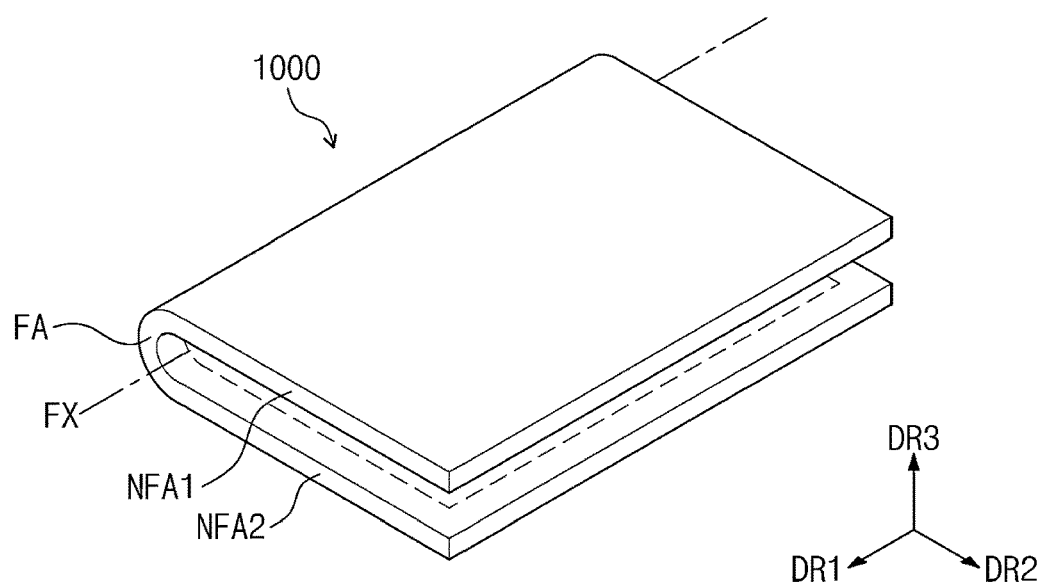

FIGS. 1A and 1B are perspective views showing a display device 1000 according to an exemplary embodiment of the present disclosure.

FIG. 1A is a perspective view showing an unfolded state of the display device 1000 according to an exemplary embodiment of the present disclosure. FIG. 1B is a perspective view showing a folded state of the display device 1000 shown in FIG. 1A.

Referring to FIGS. 1A and 1B, the display device 1000 may be a foldable display device. The display device 1000 according to the exemplary embodiment of the present disclosure may be applied to a large-sized electronic item, such as a television set or a monitor, or a small and medium-sized item, such as a mobile phone, a tablet computer, a car navigation unit, a game unit, or a smart watch.

An upper surface of the display device 1000 may be defined as a display surface DS, and the display surface DS may have a plane surface defined by a first direction DR1 and a second direction DR2.

The display surface DS may include a display area DA and a non-display area NDA around the display area DA. The display area DA may be an active area through which an image IM is displayed, and the non-display area NDA may be a non-active area through which the image IM is not displayed. FIG. 1A shows application icons as a representative example of the image IM.

The display area DA may have a quadrangular shape. The non-display area NDA may surround the display area DA. However, the shapes of the display area DA and non-display area NDA of the present disclosure should not be limited thereto or thereby. The shape of the display area DA and the shape of the non-display area NDA may be designed relative to each other.

The display device 1000 may include a first non-foldable area NFA1, a foldable area FA, and a second non-foldable area NFA2, which are sequentially defined in the display device 1000 along the second direction DR2. That is, the foldable area FA may be defined between the first non-foldable area NFA1 and the second non-foldable area NFA2. FIGS. 1A and 1B show one foldable area FA and two non-foldable areas, e.g., the first and second non-foldable areas NFA1 and NFA2. However, the number of the foldable areas and the non-foldable areas of the present disclosure should not be limited thereto or thereby. For example, the display device 1000 may include three or more non-foldable areas and foldable areas disposed between the non-foldable areas in another embodiment.

The display device 1000 may be folded around a folding axis FX. That is, the foldable area FA may be folded around the folding axis FX. The folding axis FX may extend in the first direction DR1. The folding axis FX may be defined as a short folding axis substantially parallel to short sides of the display device DD.

When the display device 1000 is folded, the display surface corresponding to the first non-foldable area NFA1 and the display surface corresponding to the second non-foldable area NFA2 may face each other. Accordingly, the display surface DS may not be exposed to the outside in the folded state. However, this is merely exemplary. According to another exemplary embodiment of the present disclosure, when the display device 1000 is folded, the display surface corresponding to the first non-foldable area NFA1 and the display surface corresponding to the second non-foldable area NFA2 may face in opposite directions. Accordingly, the display surface DS may be exposed to the outside in the folded state.

Figure 2A:
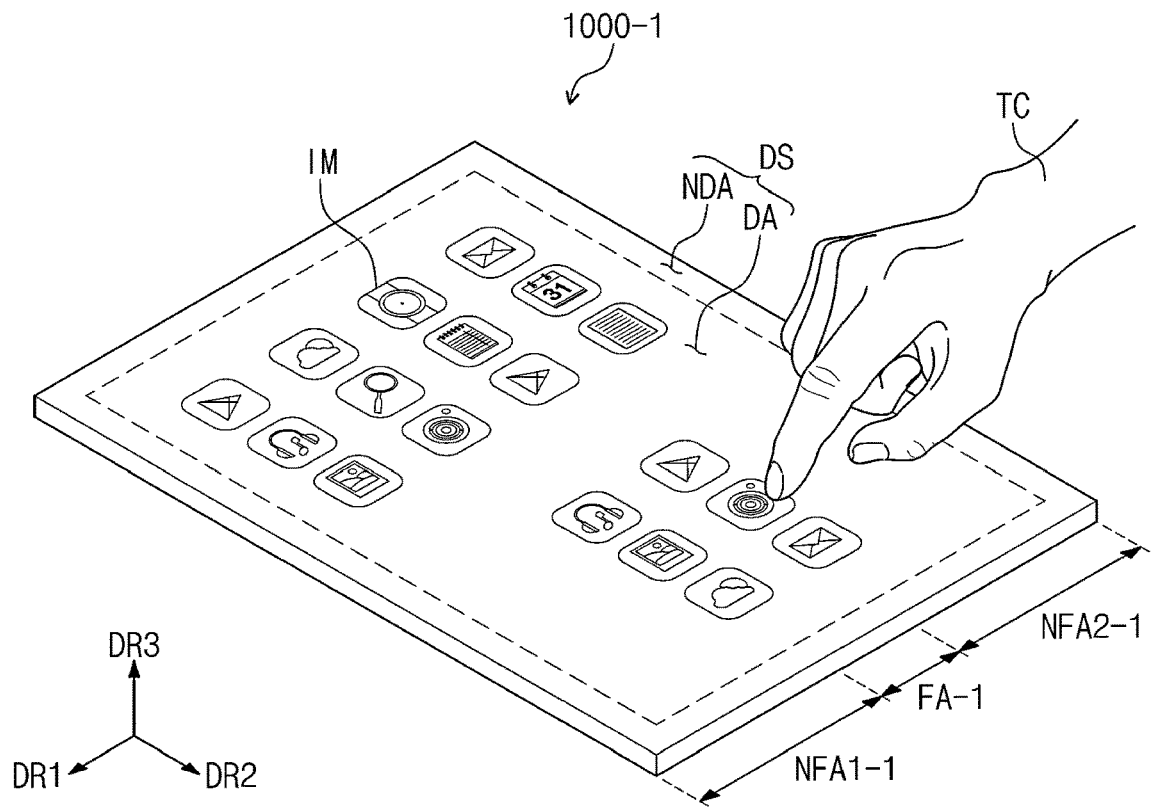
FIGS. 2A and 2B are perspective views showing a display device according to another exemplary embodiment of the present disclosure.
Figure 2B:
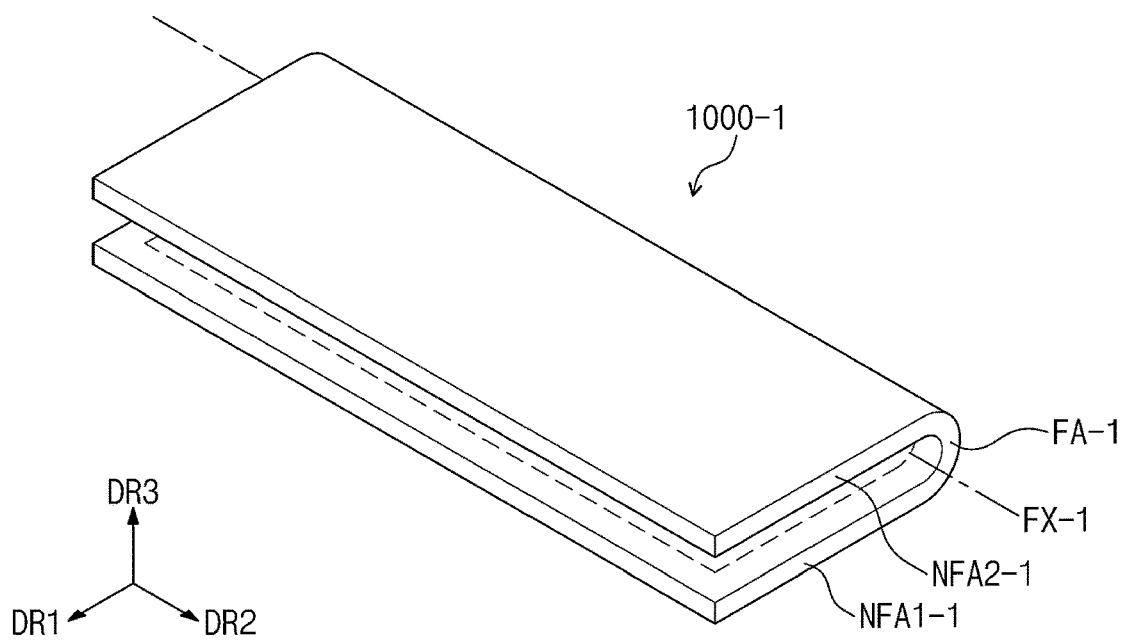

FIG. 2A is a perspective view showing a display device 1000-1 according to an exemplary embodiment of the present disclosure. FIG. 2B is a perspective view showing a folded state of the display device 1000-1 shown in FIG. 2A.

Referring to FIGS. 2A and 2B, the display device 1000-1 may include a first non-foldable area NFA1-1, a foldable area FA-1, and a second non-foldable area NFA2-1, which are sequentially defined in the display device 1000-1 along the first direction DR1. That is, the foldable area FA-1 may be defined between the first non-foldable area NFA1-1 and the second non-foldable area NFA2-1.

The display device 1000-1 may be folded around a folding axis FX-1. That is, the folding area FA-1 may be folded around the folding axis FX-1. The folding axis FX-1 may extend in the second direction DR2. The folding axis FX-1 may be defined as a long folding axis substantially parallel to long sides of the display device 1000-1.

Hereinafter, a structure of the display device 1000 folded around the short folding axis will be described in detail. However, structures described below may be applied to the display device 1000-1 that is folded around the long folding axis.

Figure 3:
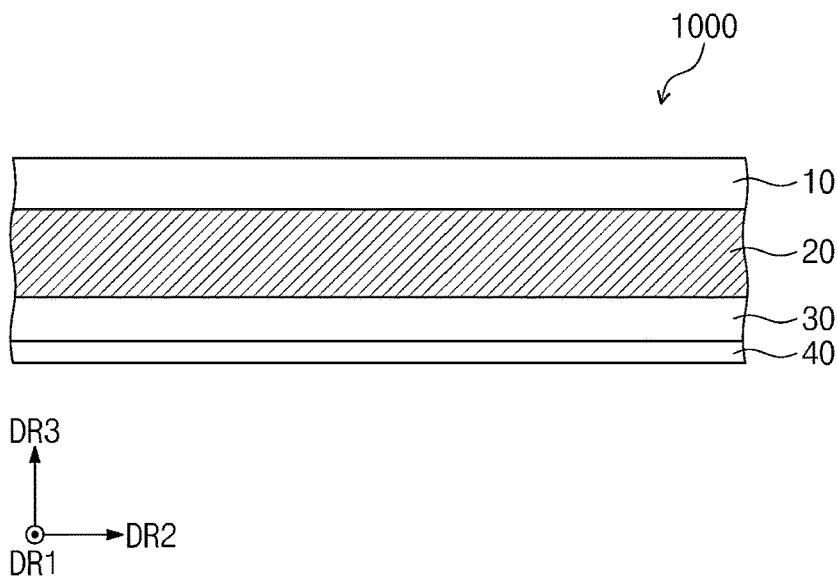
FIG. 3 is a cross-sectional view schematically showing a display device according to an exemplary embodiment of the present disclosure.

FIG. 3 is a cross-sectional view schematically showing the display device 1000 according to an exemplary embodiment of the present disclosure.

Referring to FIG. 3, the display device 1000 may include a display module 10, a support substrate 20, a support plate 30, and a cushion member 40.

The display module 10 may display the image IM (refer to FIG. 1A) and may sense an external input TC (refer to FIG. 1A). The external input TC may be a user input. The user input may include various types of external inputs, such as a part of the user's body, light, heat, or pressure. In FIG. 1A, the external input TC is shown as a user's hand being applied to the display surface DS. However, this is merely exemplary. As described above, the external input TC may be provided in various forms. In addition, the display device 1000 may sense the external input TC applied to a side or rear surface of the display device 1000 depending on its structure, however, it should not be limited to a specific embodiment. This will be described in more detail with reference to FIG. 4.

A cover panel and members (hereinafter, referred to as "lower members") may be disposed under the display module 10. The cover panel may include the support substrate 20 and a heat dissipation plate (not shown). The lower members may include the support plate 30, the cushion member 40, and an auxiliary plate 50 (refer to FIG. 9). In this application, "under" is measured in the figures where the arrow of the third direction DR3 points upward.

The support substrate 20 may support the display module 10. The support substrate may include a sponge, a foam, or a urethane resin. The support substrate 20 may protect the display module 10 from external impacts.

The support plate 30 may be disposed under the support substrate 20. The support plate 30 may include a stainless steel, aluminum, or an alloy thereof. The support plate 30 may have a strength greater than a strength of the display module 10. The support plate 30 may support the display module 10 and the support substrate 20 and may protect the display module 10 from the external impacts. The support plate 30 may prevent a foreign substance from entering the display module 10. The support plate 30 may have a thickness from about 100 micrometers to about 150 micrometers.

The cushion member 40 may be disposed under the support plate 30. The cushion member 40 may include a thermoplastic polyurethane material. The cushion member 40 may be a thin material and may protect the support plate 30 from external impacts. The cushion member 40 may have a thickness from about 8 micrometers to about 12 micrometers.

FIG. 3 schematically shows the cross-section of the stack structure of the display device 1000 according to an exemplary embodiment, and hereinafter, this will be described in more detail with reference to FIGS. 4 to 9.

Figure 4:
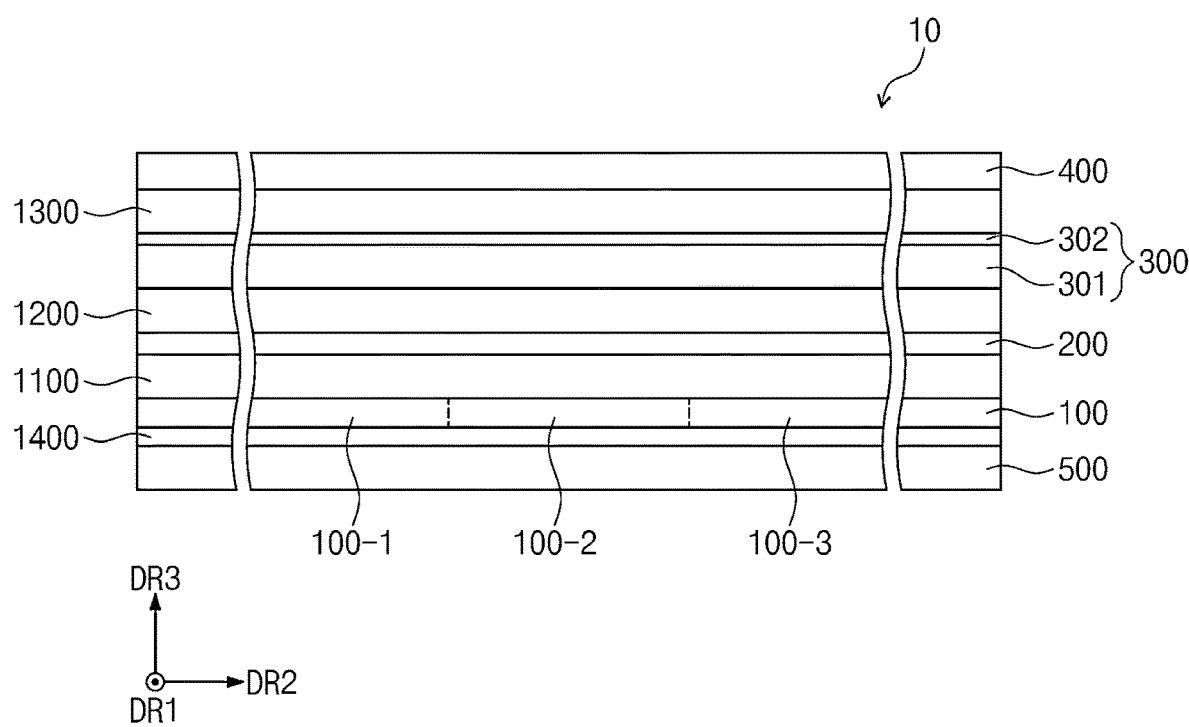
FIG. 4 is a cross-sectional view showing a display module according to an exemplary embodiment of the present disclosure.

FIG. 4 is a cross-sectional view showing the display module 10 according to an exemplary embodiment of the present disclosure.

Referring to FIG. 4, the display module 10 may include a display panel 100, an anti-reflection layer 200, a window 300, an upper protection film 400, and a lower protection film 500. Although not shown in figures, the display module 10 may further include an input sensing layer that obtains coordinate information of the external input.

The display panel 100 according to an exemplary embodiment of the present disclosure may be a light-emitting type display panel. However, the type of the display panel 100 of the present disclosure should not be particularly limited. For instance, the display panel 100 may be an organic light-emitting display panel or a quantum dot light-emitting display panel. A light-emitting layer of the organic light-emitting display panel may include an organic light-emitting material. A light-emitting layer of the quantum dot light-emitting display panel may include a quantum dot or a quantum rod.

The input sensing layer may be disposed directly on the display panel 100. For example, the input sensing layer may be formed right on the display panel 100 through successive manufacturing processes. The input sensing layer may include a plurality of insulating layers and a plurality of conductive layers. The conductive layers may form a sensing electrode sensing the external input, a sensing line connected to the sensing electrode, and a sensing pad connected to the sensing line. The input sensing layer may sense the external input by a mutual capacitance method and/or a self-capacitance method. However, the method of sensing the external input of the present disclosure should not be limited thereto or thereby.

The display panel 100 may include a first area 100-1, a second area 100-2, and a third area 100-3, which are defined in the display panel 100 along the second direction DR2. The first area 100-1 may correspond to the first non-foldable area NFA1 of FIG. 1A, the second area 100-2 may correspond to the foldable area FA of FIG. 1A, and the third area 100-3 may correspond to the second non-foldable area NFA2 of FIG. 1A. That is, each of the first area 100-1 and the third area 100-3 may be a non-foldable area, and the second area 100-2 may be a foldable area.

The anti-reflection layer 200 may be disposed on the display panel 100. The anti-reflection layer 200 may reduce a reflectance of an external light incident thereto from the outside of the anti-reflection layer 200. The anti-reflection layer 200 according to the exemplary embodiment of the present disclosure may include a retarder and a polarizer. The retarder may be a film type or liquid crystal coating type and may include a 212 retarder and/or a 214 retarder. The polarizer may be a film type or liquid crystal coating type. The film type polarizer may include a stretching type synthetic resin film, and the liquid crystal coating type polarizer may include liquid crystals aligned in a predetermined alignment. The retarder and the polarizer may further include a protective film.

The anti-reflection layer 200 may include color filters. The color filters may have a predetermined alignment. The alignment of the color filters may be determined by taking into account the emission colors of pixels included in the display panel 100. The anti-reflection layer 200 may further include a black matrix disposed adjacent to the color filters.

The anti-reflection layer 200 may include a destructive interference structure. For instance, the destructive interference structure may include a first reflection layer and a second reflection layer, which are disposed on different layers from each other. A first reflection light and a second reflection light, which are reflected by the first reflection layer and the second reflection layer, respectively, may interfere destructively with each other, and thus, the reflectance of the external light may be reduced.

An adhesive layer 1100 may be disposed between the display panel 100 and the anti-reflection layer 200. The display panel 100 and the anti-reflection layer 200 may be coupled to each other by the adhesive layer 1100. In another exemplary embodiment of the present disclosure, the adhesive layer 1100 may be omitted. The adhesive layers described in the present disclosure may include a conventional adhesive. As an example, each adhesive layer may include a pressure sensitive adhesive ("PSA"), an optically clear adhesive ("OCA"), or an optically clear resin ("OCR").

The window 300 may be disposed on the anti-reflection layer 200. The window 300 may include a base layer 301 and a functional coating layer 302. The base layer 301 may include a glass substrate and/or a synthetic resin film. For example, the base layer 301 may include a polyimide film. The base layer 301 of the present disclosure should not be limited to a single-layer structure. The base layer 301 may include two or more films coupled to each other by an adhesive member in another embodiment. The functional coating layer 302 may include at least one of an anti-fingerprint layer, an anti-reflection layer, and a hard coating layer.

An adhesive layer 1200 may be disposed between the window 300 and the anti-reflection layer 200. However, the adhesive layer 1200 may be omitted in another embodiment.

The upper protection film 400 may be disposed on the window 300. As the upper protection film 400 is added, an impact resistance characteristic of the display device 1000 may be improved. The upper protection film 400 may be a polymer film or a tempered glass film. An adhesive layer 1300 may be disposed between the upper protection film 400 and the window 300. However, the adhesive layer 1300 may be omitted in another embodiment. In addition, the upper protection film 400 may be omitted in another exemplary embodiment of the present disclosure.

The lower protection film 500 may be disposed under the display panel 100. The lower protection film 500 may protect a rear surface (i.e., lower surface) of the display panel 100. The lower protection film 500 may include a synthetic resin film, e.g., a polyimide film or a polyethylene terephthalate film. However, this is merely exemplary, and the lower protection film 500 of the present disclosure should not be limited thereto or thereby. An adhesive layer 1400 may be disposed between the lower protection film 500 and the display panel 100.

In the exemplary embodiment of the present disclosure, the support substrate 20 (refer to FIG. 3) may be disposed under the lower protection film 500 of the display module 10. A first adhesive member AD1 (refer to FIG. 6A) may be disposed between the lower protection film 500 and the support substrate 20.

Figure 5A:
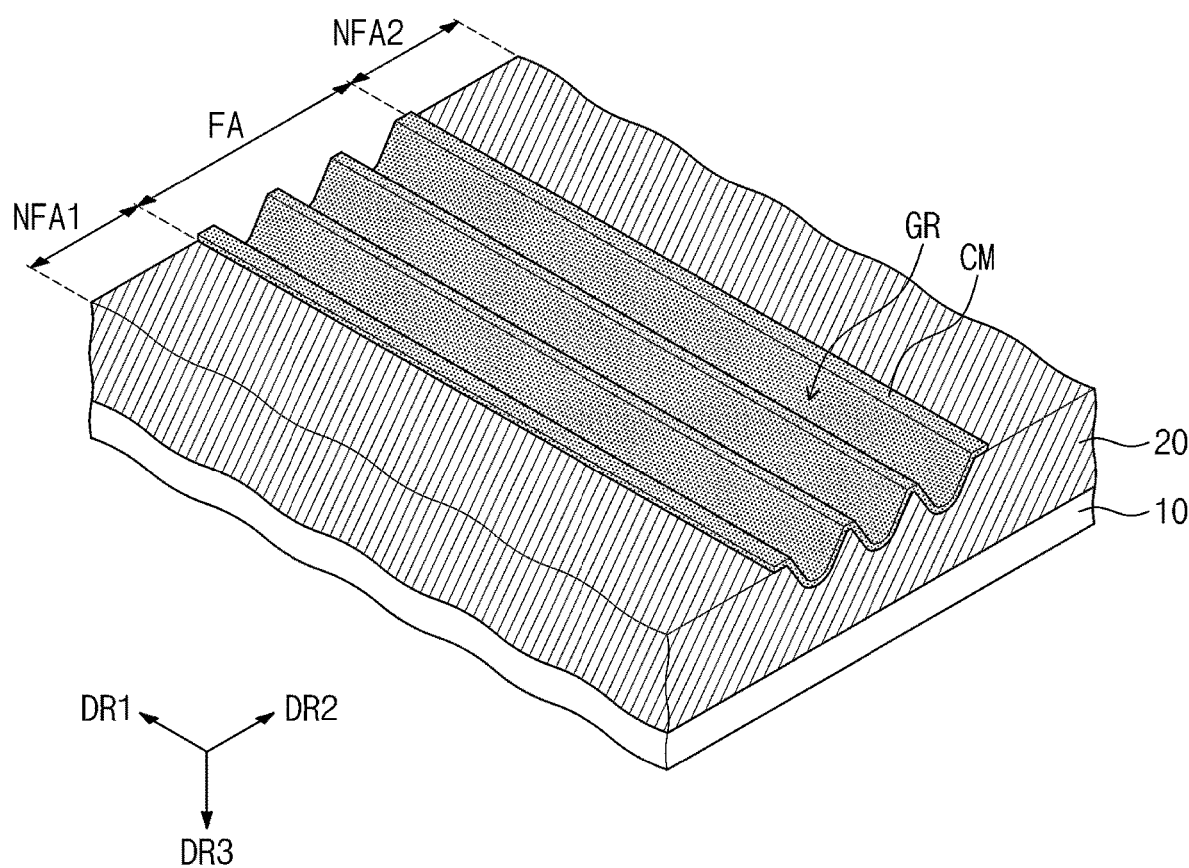
FIG. 5A is a perspective view showing a support substrate according to an exemplary embodiment of the present disclosure.
Figure 5B:
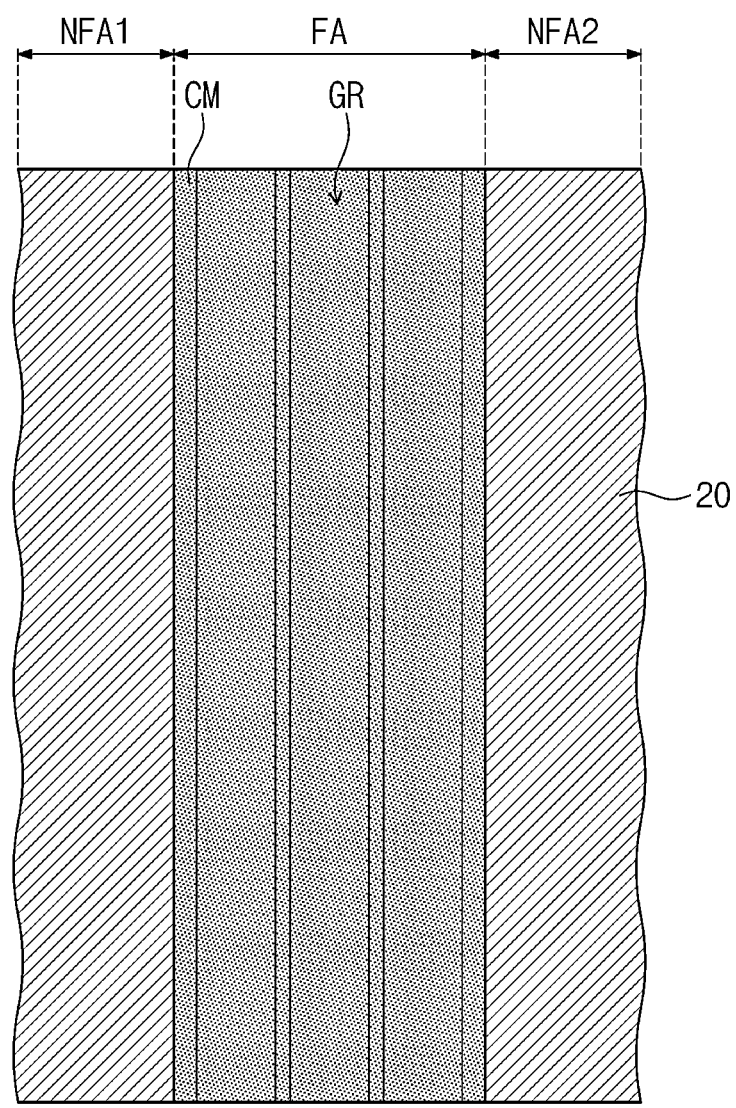
FIG. 5B is a plan view showing the support substrate according to an exemplary embodiment of the present disclosure.
Figure 6A:
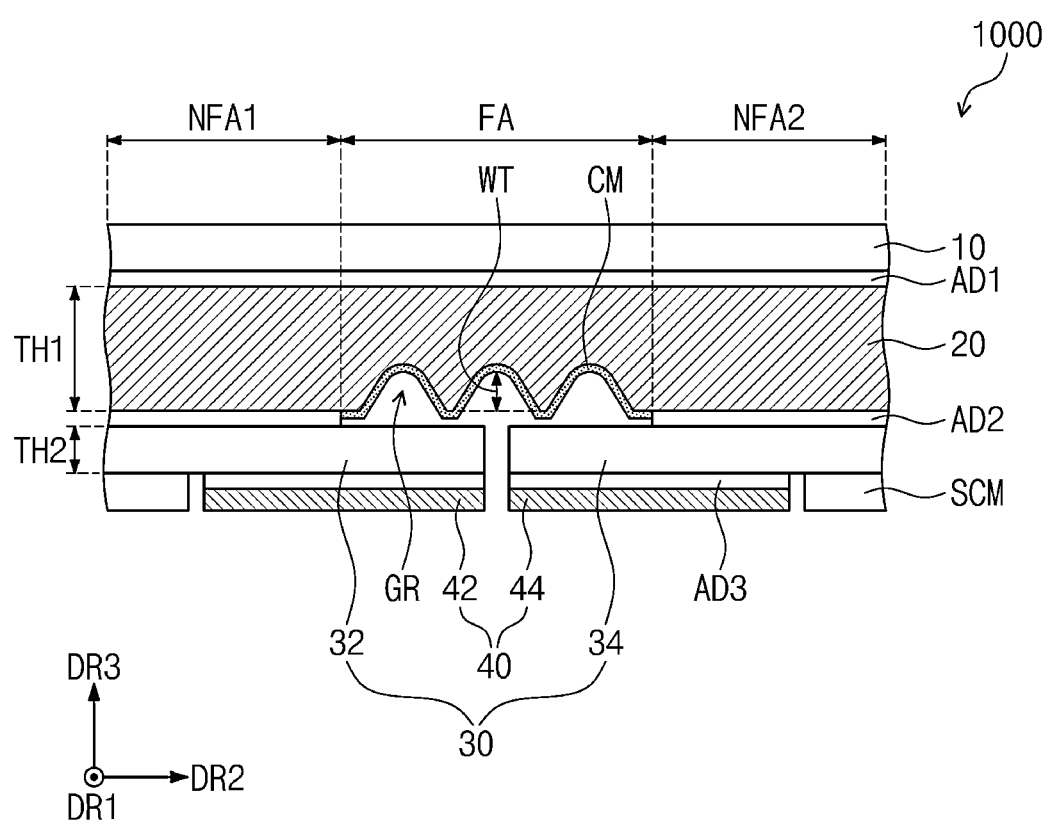
FIGS. 6A and 6B are cross-sectional views showing a display device according to an exemplary embodiment of the present disclosure.
Figure 6B:
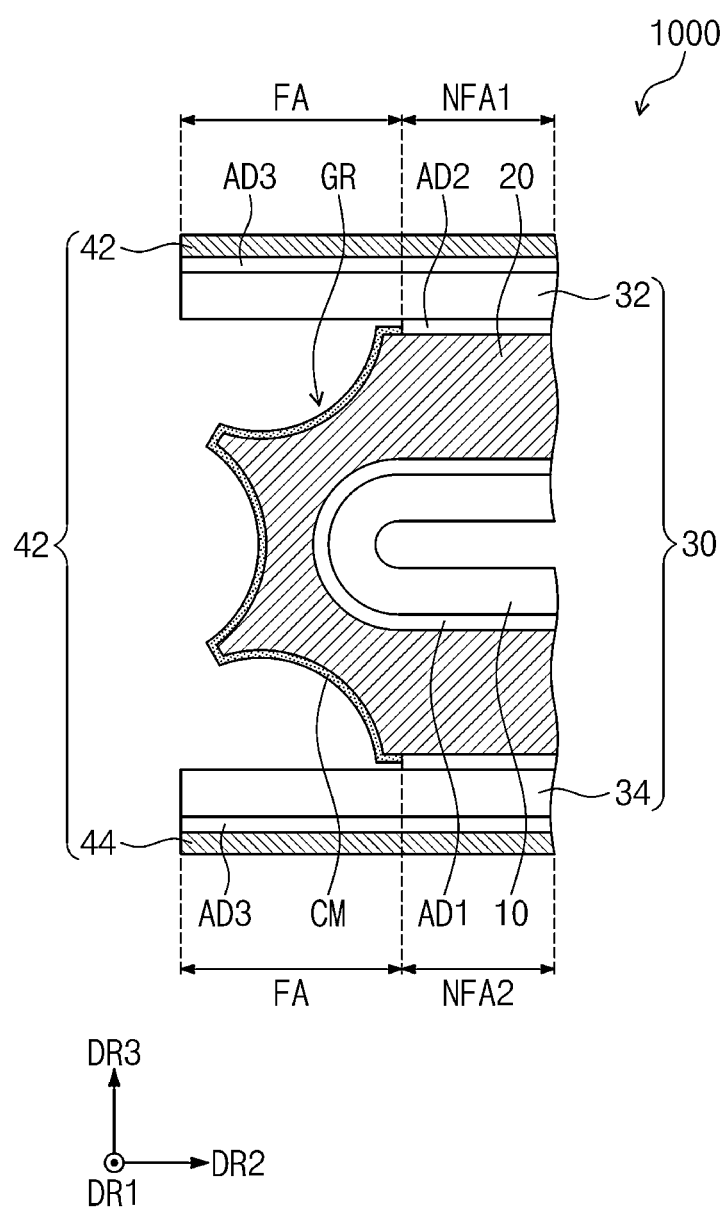

FIGS. 6A and 6B are cross-sectional views showing a display device according to an exemplary embodiment of the present disclosure. FIG. 6B is a view showing a folded state of the display device of FIG. 5A. FIG. 5A is a perspective view showing the support substrate according to an exemplary embodiment of the present disclosure. FIG. 5B is a plan view showing the support substrate 20 according to an exemplary embodiment of the present disclosure.

Referring to FIGS. 5A to 6B, the display device 1000 may include the display module 10, the support substrate 20, first and second support plates 32 and 34, and first and second cushion members 42 and 44.

Referring to FIGS. 6A and 6B, the display device 1000 may include the first non-foldable area NFA1, the second non-foldable area NFA2, and the foldable area FA. The display module 10 may be in a first state that is a flat state (i.e., unfolded state) as shown in FIG. 6A or may be in a second state that is a folded state as shown in FIG. 6B. In the folded state of the display device 1000, the display module 10 and the support substrate 20 may be folded in the foldable area FA and may be maintained in the flat state in the first and second non-foldable areas NFA1 and NFA2. According to the exemplary embodiment, a portion of the display module 10 corresponding to the foldable area FA is folded in the second state, and thus, the first non-foldable area NFA1 and the second non-foldable area NFA2 may face each other in the second state.

The display module 10 may include the display panel 100. Repetitive descriptions are omitted.

Referring to FIGS. 5A to 6B, the support substrate 20 may be disposed under the display module 10 and may support the display module 10. The support substrate 20 may act as a cushion to prevent the display module 10 from being damaged. In the present exemplary embodiment, the support substrate 20 may have a thickness TH1 that is two to two and a half times greater than a thickness of a conventional support substrate (not shown). For example, the thickness TH1 of the support substrate 20 in the thickness direction (i.e., the third direction DR3) may be within a range from about 200 micrometers (0.2 millimeters) to about 300 micrometers (0.3 millimeters). In the present exemplary embodiment, since the support substrate 20 may support the display module 10 and may act as the cushion to protect the display module 10 from the impacts, the support substrate 20 may have the thickness TH1 greater than the thickness of the conventional support substrate.

The support substrate 20 may include an upper surface facing the display module 10 and a lower surface opposite to the upper surface. The support substrate 20 may be provided with at least one groove GR defined in the lower surface of the support substrate 20. In figures (e.g., FIGS. 5A to 6B), three grooves GR are defined, however, the number of the grooves GR of the present disclosure should not be limited to three. The support substrate 20 may have the thickness TH1 sufficient to define the groove GR. That is, the support substrate may have the thickness TH1 that is sufficiently thick to act as the cushion even when the thickness is reduced in the foldable area FA due to the arrangement of the groove GR. The groove GR may overlap the foldable area FA in a plan view. In the exemplary embodiment, the groove GR may be defined to overlap the entire foldable area FA. As shown in figures, three grooves GR overlap the entire foldable area FA, however, they should not be limited thereto or thereby. Regardless of the number of grooves GR, the groove GR may overlap a portion of the foldable area FA in another embodiment. The groove GR may be provided in plural, and the grooves GR may be consecutively arranged and may have a plurality of curved-concaved shapes in a thickness direction of the support substrate 20. In this application, "overlap" is interpreted to mean "overlap in the thickness direction in the unfolded state" unless the content clearly indicates otherwise.

When the groove GR is provided in plural, the grooves GR may be arranged continuously or discontinuously in the foldable area FA. That is, when the grooves GR are arranged discontinuously, a flat surface may exist between the grooves GR.

In the exemplary embodiment, a depth WT of the groove GR in a third direction DR3, may be equal to or smaller than a half of a thickness of the support substrate 20. When the depth WT of the groove GR is too large, the support substrate 20 may not act as the cushion in the foldable area FA. For example, the width of the groove GR may be within a range from about 80 micrometers to about 150 micrometers.

Referring to FIGS. 5A to 6B, the support substrate 20 may further include a protective layer CM. The protective layer CM may be disposed along a surface of at least one groove GR. The protective layer CM may overlap the foldable area FA in a plan view. The protective layer CM may be disposed on a lower surface of the support substrate 20 that overlaps the entire foldable area FA and defines the groove GR. The protective layer CM may include a non-adhesive material. In a case where a foreign substance enters the groove GR, the protective layer CM may prevent the foreign substance from adhering to the surface of the groove GR. The protective layer CM may include an ultraviolet coating member. That is, the protective layer CM may be formed by coating an ultraviolet curable material on the surface of the groove GR and curing the coated ultraviolet curable material.

The protective layer CM may include an anti-static material. Static electricity may be generated on the surface of the groove GR while the display device 1000 are repeatedly folded and unfolded. However, since the protective layer CM disposed on the surface of the groove GR may include the anti-static material, the static electricity may be prevented from occurring.

The support plate 30 may include the first support plate 32 and the second support plate 34. The first support plate 32 and the second support plate 34 may be a metal plate. The first and second support plates 32 and 34 may be spaced apart from each other in the foldable area FA. In FIG. 6B, the first and second support plates 32 and 34 may face each other in the third direction DR3 when the display device 1000 is in the folded state. The first and second support plates 32 and 34 may be disposed under the support substrate 20 in the unfolded state to support the support substrate 20 and the display module 10 and may prevent the support substrate 20 and the display module 10 from being pressed, dented, and the like. The support substrate 20 may prevent a foreign substance from entering the display device 1000. Each of the first and second support plates 32 and 34 may have a thickness of about 150 micrometers in the third direction DR3. Accordingly, the thickness of the support substrate 20 may be greater than the thickness of each of the first and second support plates 32 and 34.

The cushion member 40 may include the first cushion member 42 and the second cushion member 44. The first cushion member 42 may be disposed under the first support plate 32, and the second cushion member 44 may be disposed under the second support plate 34 in the unfolded state. The first cushion member 42 may be disposed to overlap a portion of the foldable area FA and a portion of the first non-foldable area NFA1, and the second cushion member 44 may be disposed to overlap another portion of the foldable area FA and a portion of the second non-foldable area NFA2. The first and second cushion members 42 and 44 may support the first and second support plates 32 and 34, respectively, and may prevent the first and second support plates 32 and 34 from being impacted, pressed, and deformed by external forces. The first and second cushion members 42 and 44 may have a thickness from about 6 micrometers to about 10 micrometers in the third direction DR3.

The first adhesive member AD1 may be disposed between the display module 10 and the support substrate 20. A second adhesive member AD2 may be disposed between the support substrate 20 and each of the first and second support plates 32 and 34, and a third adhesive member AD3 may be disposed between the first support plate 32 and the first cushion member 42 and between the second support plate 34 and the second cushion member 44. The first, second, and third adhesive members AD1, AD2, and AD3 may be an adhesive tape. The first, second, and third adhesive members AD1, AD2, and AD3 may be a pressure sensitive adhesive (PSA), an optical clear adhesive (OCA), or an optical clear resin (OCR).

A step-difference compensation member SCM may be disposed under the first and second support plates 32 and 34 in an area in which the first cushion member 42 or the second cushion member 44 is not disposed. The step-difference compensation member SCM may be various types of adhesives including the pressure sensitive adhesive. Although not shown in figures, the step-difference compensation member SCM may combine the first and second support plates 32 and 34 with a lower set. The lower set may correspond to a housing that covers the display module 10, the cover panel, and the lower members.

FIGS. 7A to 7H are views showing a method of manufacturing a display device according to an exemplary embodiment of the present disclosure.

Referring to FIGS. 7A to 7H, the manufacturing method of the display device may include providing the display module 10 including the first non-foldable area NFA1, the second non-foldable area NFA2, and the foldable area FA, providing the support substrate 20 under the display module 10, and providing the first support plate 32 and the second support plate 34 disposed under the support substrate 20 and spaced apart from each other in the foldable area FA.

The providing of the support substrate 20 may include providing a preliminary support substrate 20-1 and forming at least one groove GR in the preliminary support substrate 20-1 using a jig ZG.

Figure 7A:
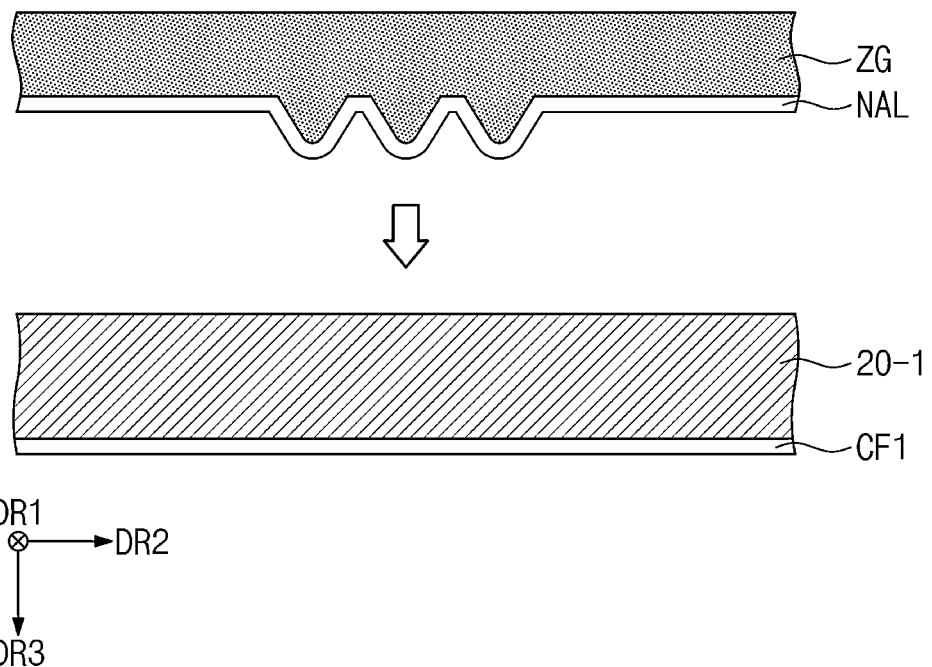
FIGS. 7A to 7H are views showing a method of manufacturing a display device according to an exemplary embodiment of the present disclosure.

The preliminary support substrate 20-1 shown in FIG. 7A may include a foam resin, a polyurethane resin, or a sponge. According to the exemplary embodiment, the preliminary support substrate 20-1 may be formed by coating (spraying) the foam resin on a first release film CF1. The first release film CF1 may be a medium-thin release film. When the preliminary support substrate 20-1 is provided, a foam resin surface of the preliminary support substrate 20-1 is pressed by the jig ZG, and thus, at least one groove GR may be formed. The jig ZG may be a mold used to form the support substrate 20 by forming a variety of patterns on the preliminary support substrate 20-1. The jig ZG may include at least one protrusion formed on a surface thereof which makes contact with the preliminary support substrate 20-1 to overlap the foldable area FA and to correspond to the at least one groove GR. The at least one protrusion may correspond to the at least one groove GR.

Figure 7B:
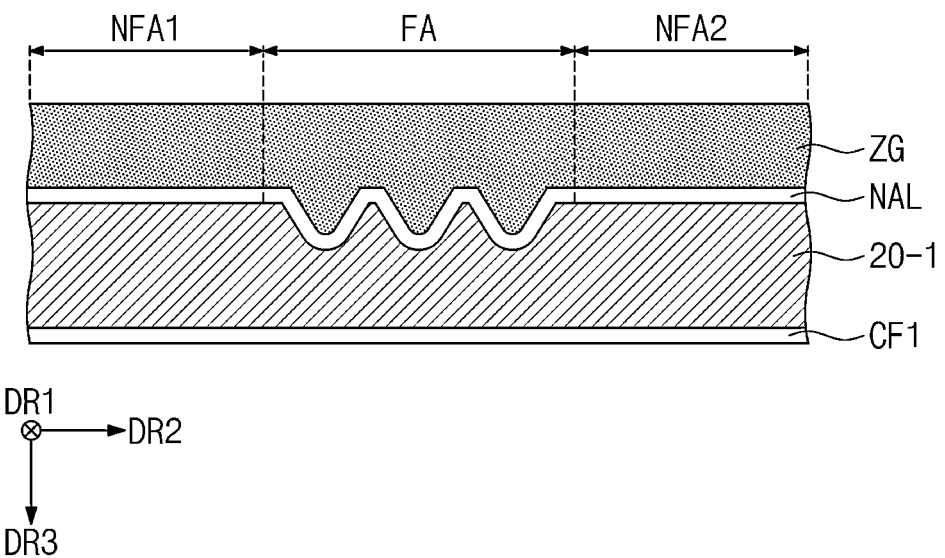

Referring to FIG. 7B, the forming of the at least one groove GR may include pressing the foam resin surface of the preliminary support substrate 20-1 with the jig ZG while drying the coated foam resin.

In the exemplary embodiment, the jig ZG may include a coating layer NAL formed on the surface thereof which makes contact with the preliminary support substrate 20-1. The coating layer NAL may prevent the preliminary support substrate 20-1 from being adhered to the jig ZG when the preliminary support substrate 20-1 is in contact with the jig ZG. The coating layer NAL may include a primer having superior water repellency or low surface energy. However, the coating layer NAL of the present disclosure should not be limited thereto or thereby. The coating layer NAL may include a variety of materials that are non-adhesive.

Figure 7C:
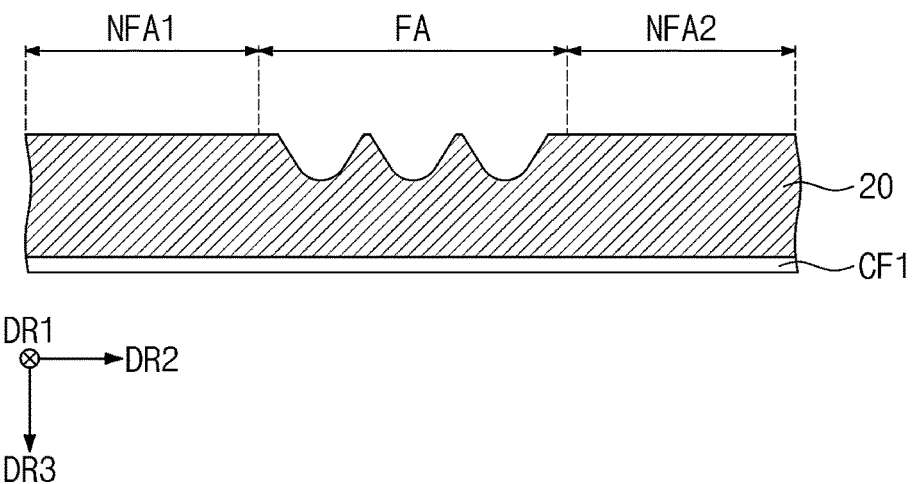
Figure 7D:
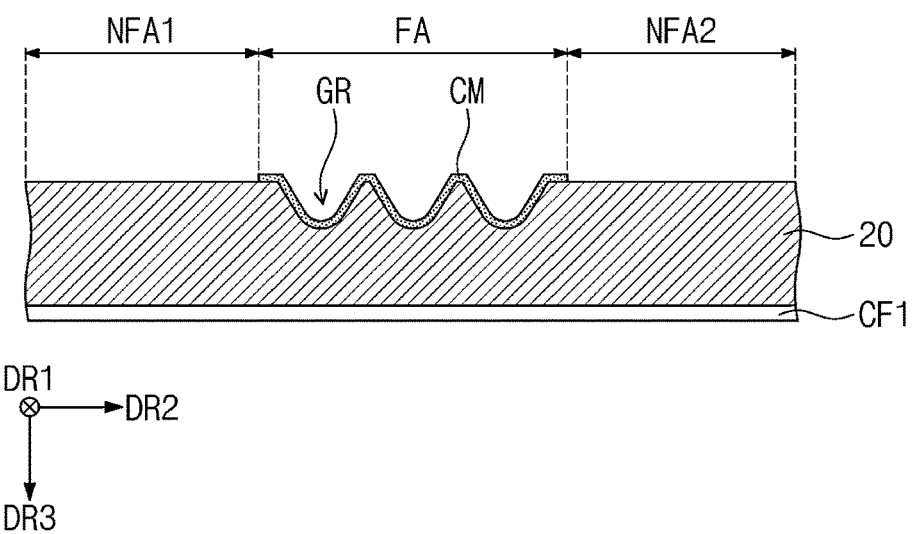

Referring to FIGS. 7C and 7D, the providing of the support substrate 20 may include coating the protective layer CM along the surface of at least one groove GR formed using the jig ZG. The protective layer CM may be formed through a UV-coating process or a primer coating process having the low surface energy. As another way, the protective layer CM may be formed using various non-adhesive materials not to be adhered to foreign substances. In the exemplary embodiment, the protective layer CM may further include the anti-static material, which prevents the static electricity from occurring in the folding or unfolding operation, with the non-adhesive materials. The protective layer CM may be coated to overlap the entire foldable area.

Referring to FIGS. 7E to 7H, the manufacturing method of the display device may include disposing the display module 10 on the support substrate 20, and the first support plate 32, and the second support plate 34 under the support substrate 20.

Figure 7E:
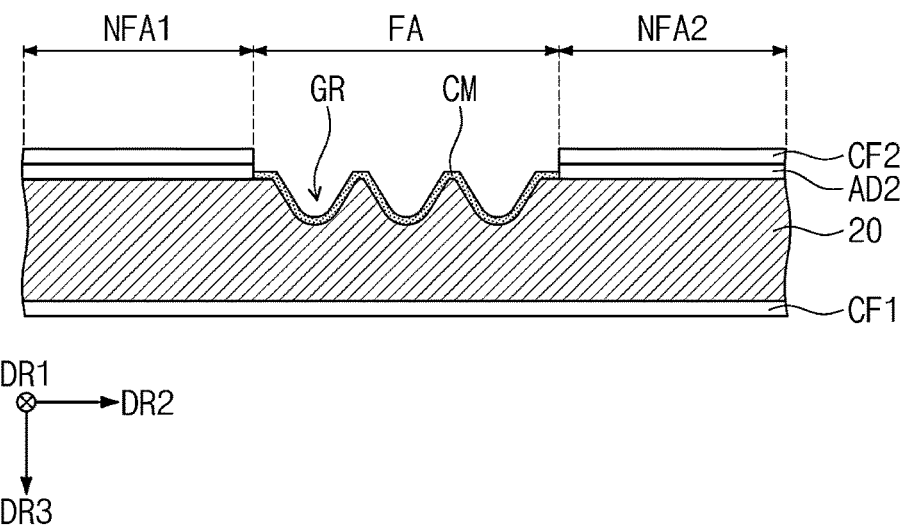
Figure 7F:
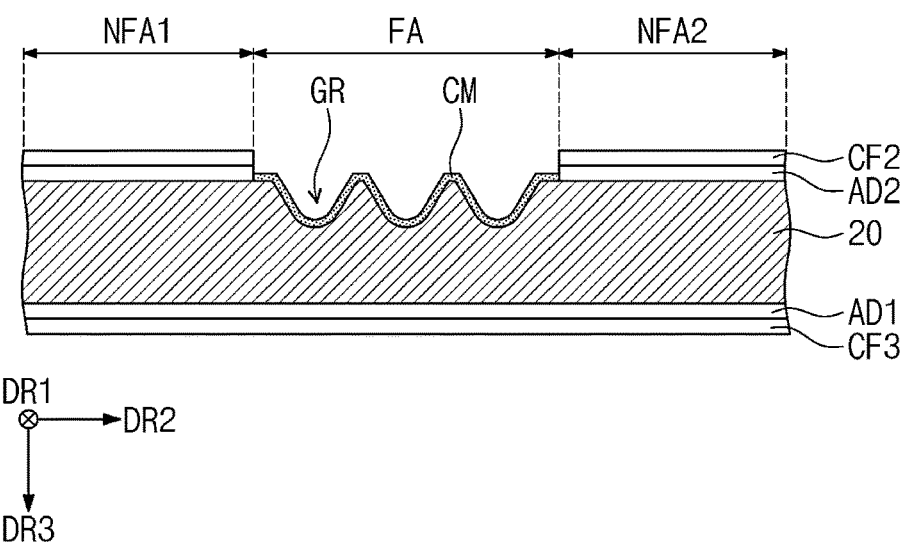

The support substrate 20 may include the upper surface facing the display module 10 and the lower surface opposite to the upper surface. The manufacturing method of the display device may include disposing the second adhesive member AD2 on the lower surface of the support substrate 20 to overlap the first non-foldable area NFA1 and the second non-foldable area NFA2. In addition, the manufacturing method of the display device may include disposing the first and second support plates 32 and 34 on the second adhesive member AD2. Referring to FIG. 7E, the disposing of the first and second support plates 32 and 34 may include coating the second adhesive member AD2 and attaching a second release film CF2 to the first and second support plates 32 and 34 through the second adhesive member AD2. Referring to FIG. 7F, the manufacturing method of the display device may include removing the first release film CF1, coating the first adhesive member AD1 on the support substrate 20, and attaching a third release film CF3 on the first adhesive member AD1. In the exemplary embodiment, each of the second release film CF2 and the third release film CF3 may be a medium-thin release film or a thin release film.

Figure 7G:
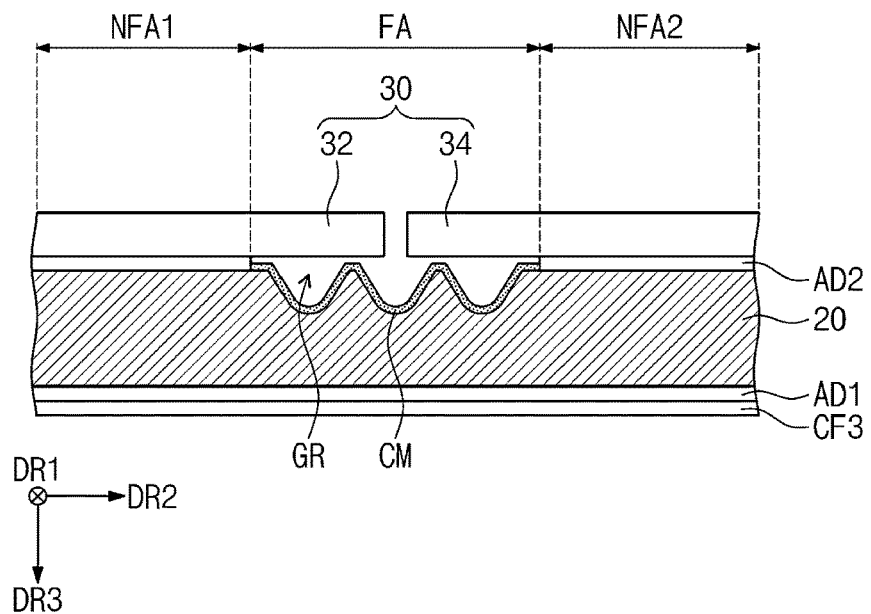
Figure 7H:
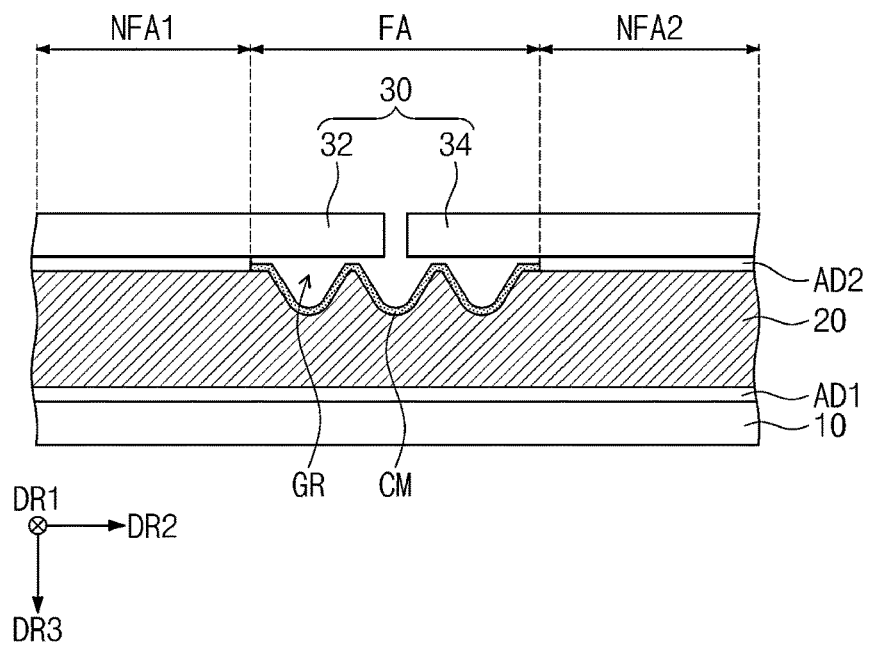

Referring to FIG. 7G, the first and second support plates 32 and 34 may be attached to the second adhesive member AD2 after the second release film CF2 is removed. In the exemplary embodiment, in the case where the second release film CF2 is the medium-thin release film, the second release film CF2 may be removed after being replaced with the thin release film. This is to prevent the removal of the other release films that is not intended when removing the second release film CF2. Referring to FIG. 7H, the display module 10 may be attached to the first adhesive member AD1 after the third release film CF3 is removed. Similarly, in the case where the third release film CF3 is the medium-thin release film, the third release film CF3 may be removed after being replaced with the thin release film.

In FIGS. 7E to 7H, the display module 10 is disposed after the first support plate 32 and the second support plate 34 are disposed. However, the sequence of disposing of the present disclosure should not be limited thereto or thereby. After the third release film CF3 is removed from the upper surface of the support substrate 20 and the display module 10 is disposed, the second release film CF2 is removed, and then the first and second support plates 32 and 34 may be disposed on the lower surface of the support substrate 20 in another embodiment.

FIGS. 8A to 8D are cross-sectional views showing a display device according to other exemplary embodiments of the present disclosure.

Figure 8A:
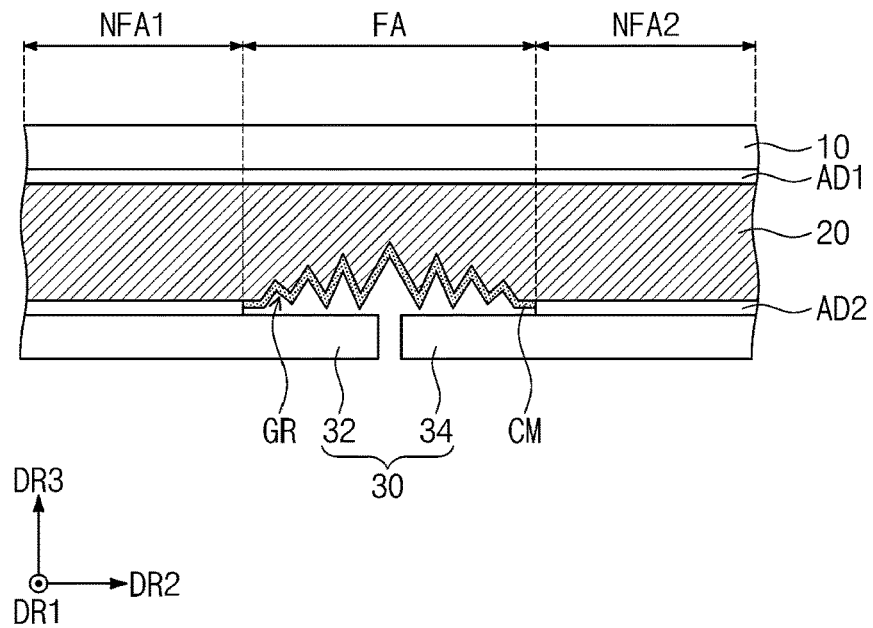
FIGS. 8A to 8D are cross-sectional views showing a display device according to other exemplary embodiments of the present disclosure.

Referring to FIG. 8A, at least one groove GR having a shape pointed in a thickness direction of the support substrate 20 may be provided, and the groove GR may be provided in plural. In the present exemplary embodiment, the grooves GR may be consecutively arranged. For example, a depth in the third direction DR3 of the grooves GR may be the greatest at a center of a foldable area FA and may become smaller in a direction from the center of the foldable area FA to the first non-foldable area NFA1 or to the second non-foldable area NFA2. The grooves GR may be arranged to overlap the entire foldable area FA. In the present exemplary embodiment, the grooves GR may overlap the entire foldable area FA. However, the grooves GR may be arranged to be slightly spaced apart from each of the first and second non-foldable areas NFA1 and NFA2 in another embodiment. This is to prevent defects of a folded portion of the support substrate 20 when the support substrate 20 is folded.

Figure 8B:
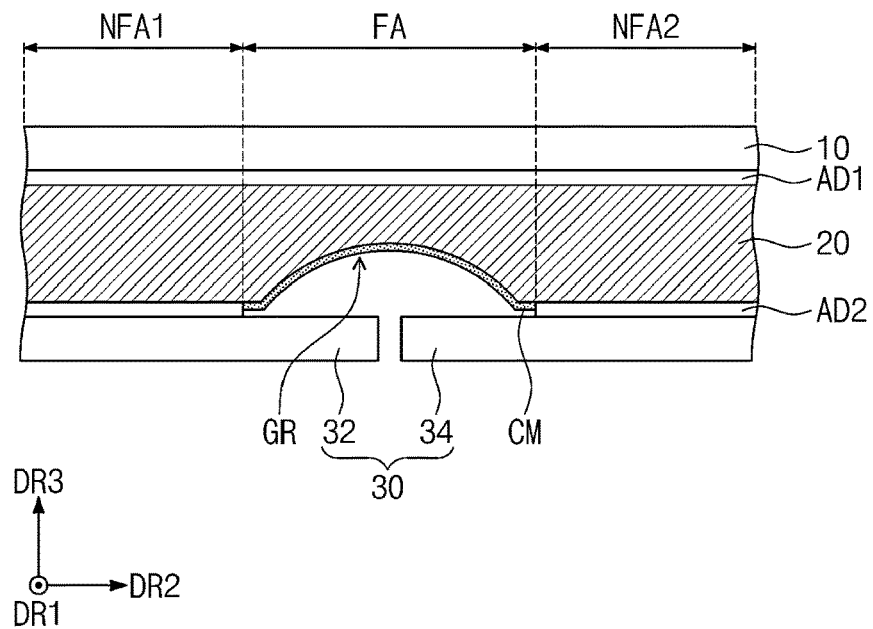

Referring to FIG. 8B, a groove GR may be provided in a curved shape that is concave in a thickness direction of a support substrate 20. The groove GR may have a recessed oval shape.

Figure 8C:
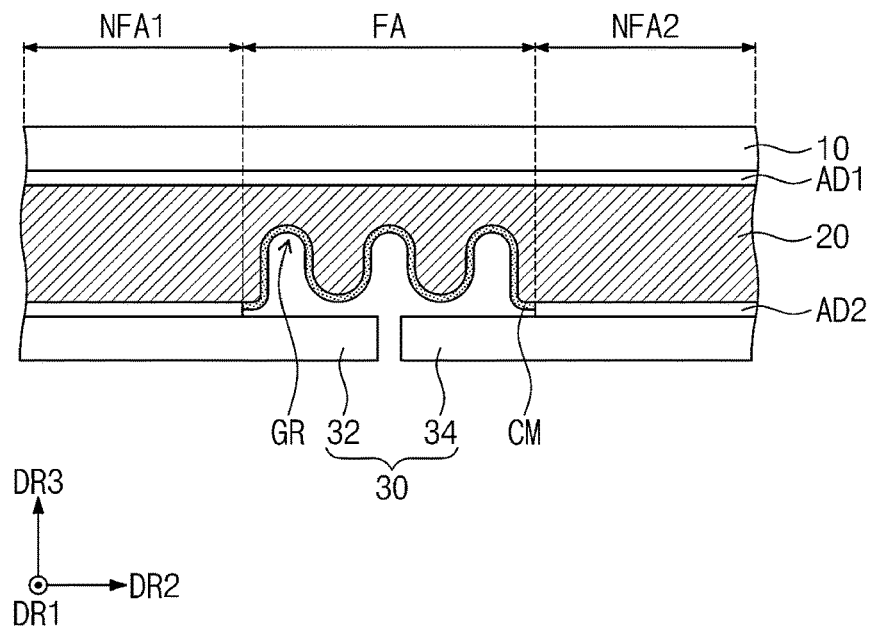

Referring to FIG. 8C, a groove GR may be provided in plural, and the grooves GR may be arranged discontinuously. The grooves GR may overlap the entire foldable area FA. The grooves GR may be concave in a thickness direction of a support substrate 20, and discontinuous surfaces having a convex curved shape in a direction (i.e., a direction opposite to the third direction DR3) opposite to the thickness direction of the support substrate 20 may be disposed between the grooves GR.

Figure 8D:
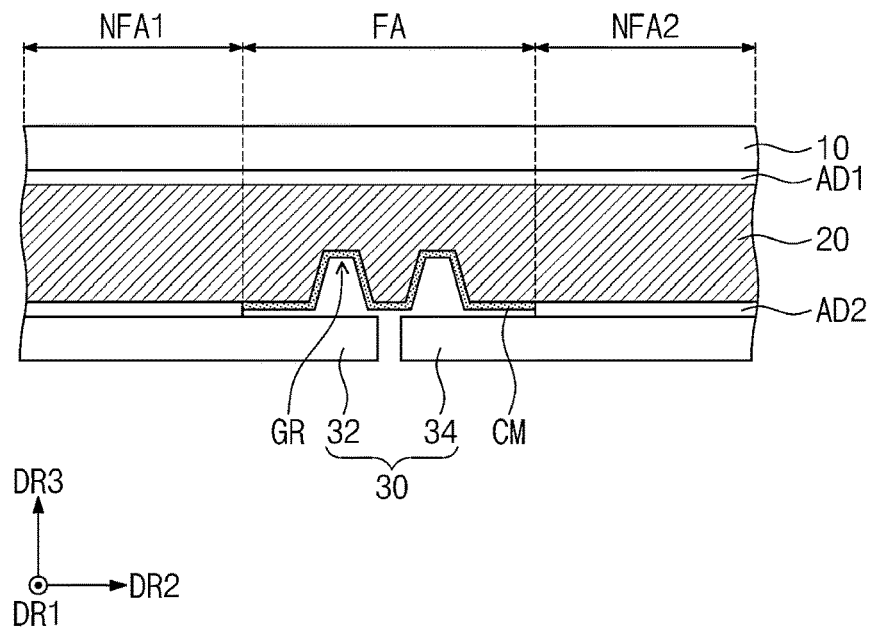

Referring to FIG. 8D, a groove GR may be provided in plural, and the grooves GR may be discontinuously arranged in a straight-line shape. In the present exemplary embodiment, the groove GR may be arranged to be spaced apart from the first and second non-foldable areas NFA1 and NFA2. That is, at least one groove GR may not overlap the entire foldable area FA. A portion of a lower surface of the support substrate 20, which does not include the groove GR, may be disposed adjacent to the first non-foldable area NFA1 or the second foldable area NFA2.

Figure 9:
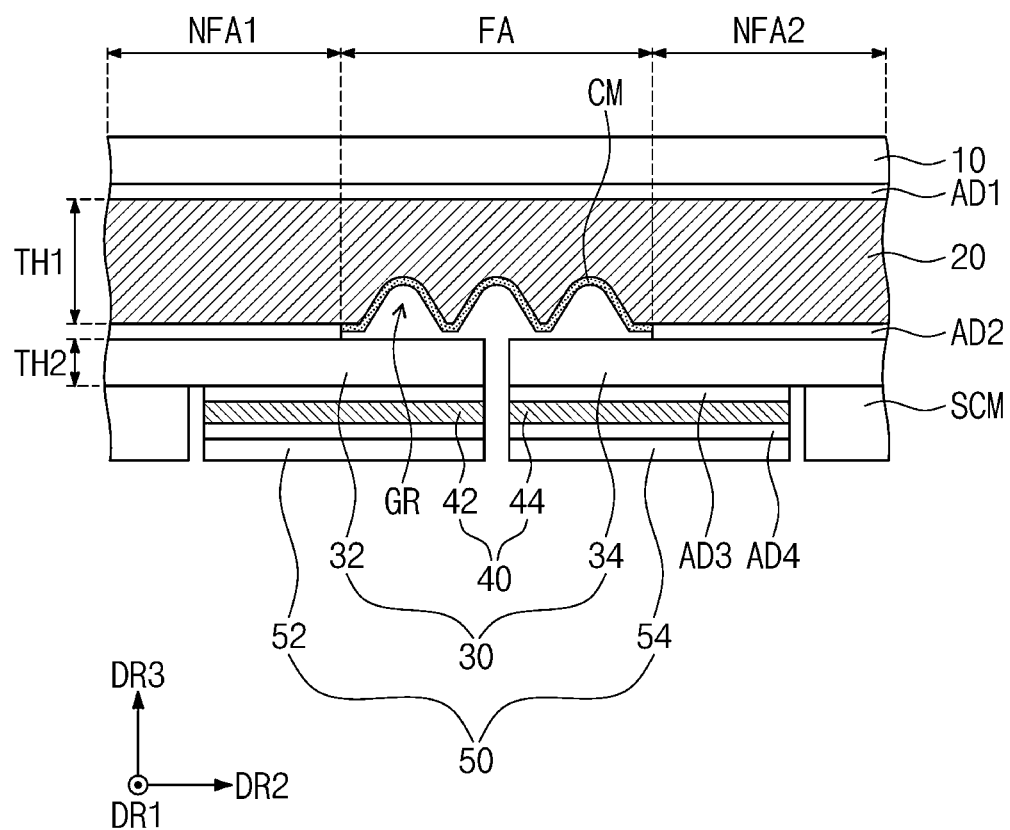
FIG. 9 is a cross-sectional view showing a display device according to another exemplary embodiment of the present disclosure.

FIG. 9 is a cross-sectional view showing a display device according to another exemplary embodiment of the present disclosure.

Referring to FIG. 9, the display device may include a first auxiliary plate 52 and a second auxiliary plate 54.

The first auxiliary plate 52 may be disposed to overlap a first cushion member 42 and may support the first cushion member 42, and the second auxiliary plate 54 may be disposed to overlap a second cushion member 44 in a plan view and may support the second cushion member 44. The first and second auxiliary plates 52 and 54 may include a metal plate. For example, the first and second auxiliary plates 52 and 54 may include a stainless steel, aluminum, or an alloy thereof. The first and second auxiliary plates 52 and 54 may prevent a foreign substance from entering the display device 1000 and may prevent a display module from being pressed or dented.

In the present exemplary embodiment, a fourth adhesive member AD4 may be disposed between the first cushion member 42 and the first auxiliary plate 52 and between the second cushion member 44 and the second auxiliary plate 54. The fourth adhesive member AD4 may be a pressure-sensitive adhesive (PSA), an optically clear adhesive (OCA), or an optically clear resin (OCR).

Although the exemplary embodiments of the present disclosure have been described, it is understood that the present disclosure should not be limited to these exemplary embodiments but various changes and modifications can be made by one ordinary skilled in the art within the spirit and scope of the present disclosure as hereinafter claimed. Therefore, the disclosed subject matter should not be limited to any single embodiment described herein, and the scope of the present inventive concept shall be determined according to the attached claims.

What is claimed is:

1. A display device comprising a first non-foldable area, a second non-foldable area, and a foldable area, the display device comprising:
    a display module comprising a display panel;
    a support substrate supporting the display module, comprising an upper surface facing the display module and a lower surface opposite to the upper surface, and provided with a groove defined in the lower surface to overlap the foldable area in a thickness direction of the support substrate;
    a first support plate disposed under the support substrate and disposed in the first non-foldable area and the foldable area, not in the second non-foldable area; and
    a second support plate disposed under the support substrate and disposed in the second non-foldable area and the foldable area, not in the first non-foldable area,
    wherein the second support plate is spaced apart from the first support plate in the foldable area, and does not overlap the first support plate in the thickness direction when the display device is unfolded.

2. The display device of claim 1, wherein the groove overlaps an entirety of the foldable area.

3. The display device of claim 1, wherein the support substrate further comprises a protective layer disposed along a surface of the groove.

4. The display device of claim 3, wherein the protective layer comprises an ultraviolet coating member.

5. The display device of claim 3, wherein the protective layer comprises an anti-static material.

6. The display device of claim 1, wherein the support substrate has a thickness in the thickness direction greater than a thickness of the first support plate and greater than a thickness of the second support plate.

7. The display device of claim 1, wherein a thickness of the support substrate is in a range from about 0.2 millimeters (mm) to about 0.25 mm.

8. The display device of claim 1, wherein a depth of the groove in the thickness direction of the support substrate is equal to or smaller than a half of a thickness of the support substrate.

9. The display device of claim 1, wherein the groove is provided in plural, and the grooves are arranged continuously or discontinuously in the foldable area.

10. The display device of claim 1, wherein the first support plate and the second support plate comprise a metal material.

11. The display device of claim 1, further comprising:
    a first cushion member disposed under the first support plate and overlapping a portion of the foldable area and a portion of the first non-foldable area in the thickness direction; and
    a second cushion member disposed under the second support plate and overlapping another portion of the foldable area and a portion of the second non-foldable area in the thickness direction.

12. The display device of claim 11, wherein each of the first cushion member and the second cushion member has a thickness from about 6 micrometers to about 10 micrometers.

13. The display device of claim 11, further comprising:
    a first auxiliary plate disposed under the first cushion member and overlapping the first cushion member in the thickness direction; and
    a second auxiliary plate disposed under the second cushion member and overlapping the second cushion member in the thickness direction.

14. The display device of claim 1, wherein the display module has a first state in which the display module is flat and a second state in which the display module in the foldable area is bent such that the first non-foldable area faces the second non-foldable area.

15. A display device comprising a first non-foldable area, a second non-foldable area, and a foldable area, the display device comprising:
- a display module comprising a display panel;
- a support substrate supporting the display module, comprising an upper surface facing the display module and a lower surface opposite to the upper surface, and provided with a groove defined in the lower surface to overlap the foldable area in a thickness direction of the support substrate;
- a first support plate disposed under the support substrate; and
- a second support plate disposed under the support substrate and spaced apart from the first support plate in the foldable area,
- wherein the support substrate further comprises a protective layer disposed along a surface of the groove.

* * * * *